United States Patent [19]
Levie

[11] 3,967,156
[45] June 29, 1976

[54] POWER SUPPLY CIRCUIT FOR A MICROWAVE OVEN

[75] Inventor: Stephen A. Levie, Minneapolis, Minn.

[73] Assignee: Litton Systems, Inc., Beverly Hills, Calif.

[22] Filed: Oct. 24, 1974

[21] Appl. No.: 517,739

[52] U.S. Cl.................................. 315/101; 315/105
[51] Int. Cl.².......................................... H05B 9/00
[58] Field of Search.............. 315/39.51, 105, 101, 315/94, 97; 323/93, 63, 64, 65

[56] References Cited
UNITED STATES PATENTS

| | | | |
|---|---|---|---|
| 3,611,027 | 10/1971 | Koinuma et al. | 315/101 X |
| 3,840,774 | 10/1974 | Iwata | 315/39.51 |

*Primary Examiner*—R. V. Rollinec
*Assistant Examiner*—Darwin R. Hostetter
*Attorney, Agent, or Firm*—Robert E. Lowe; Alan C. Rose

[57] ABSTRACT

A power supply circuit for a microwave oven which includes a magnetron, a transformer, a plural capacitor, and a current rectifier. The power supply circuit is particularly adapted to provide constant power output from the magnetron using either a 50Hz or 60Hz input power by selecting an appropriate one of said plural capacitances.

3 Claims, 1 Drawing Figure

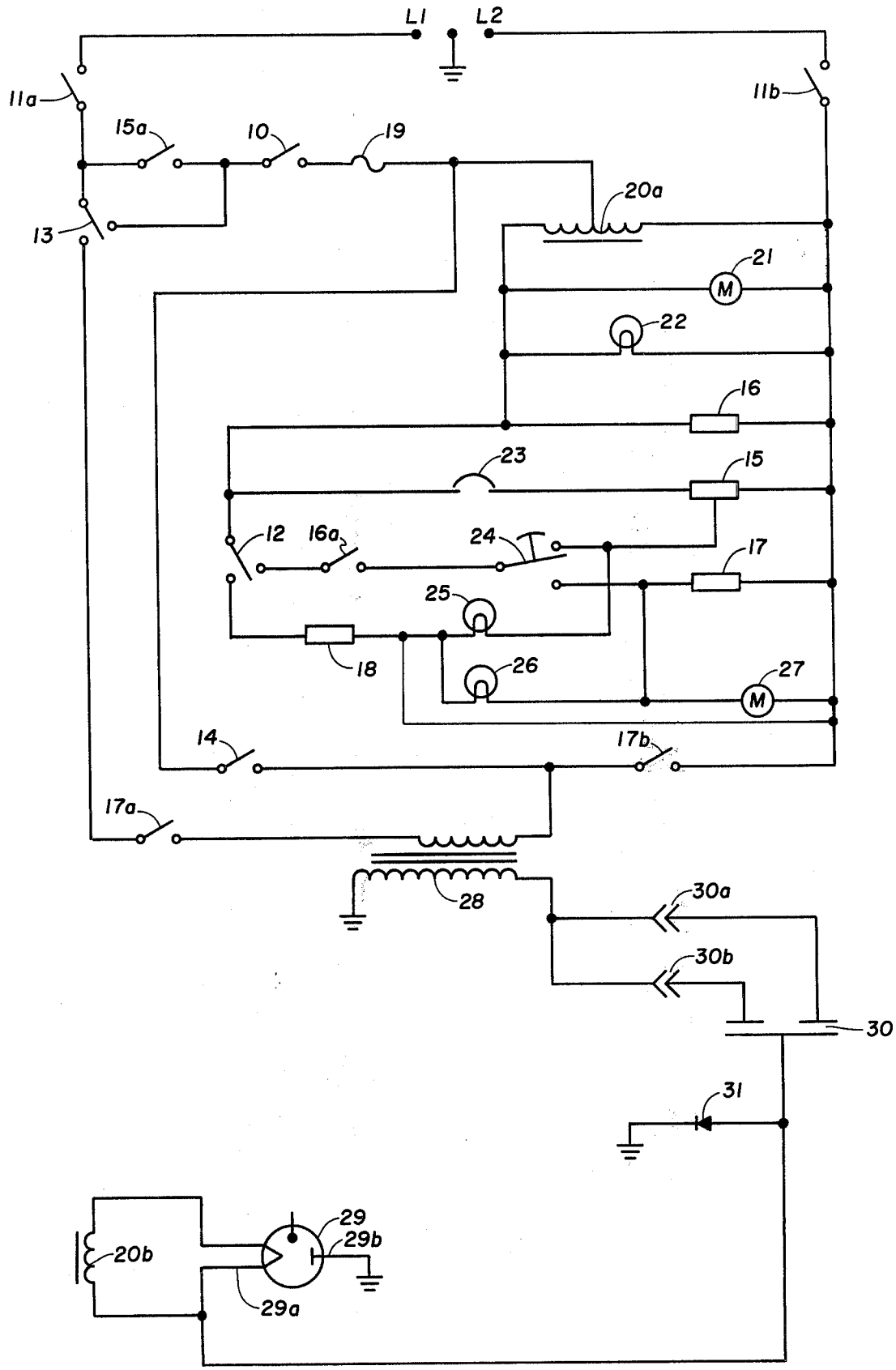

POWER SUPPLY CIRCUIT FOR A MICROWAVE OVEN

BACKGROUND OF THE INVENTION

This invention relates to power supply circuits for microwave ovens, and more particularly to a power supply circuit adapted to operate successfully on either 50Hz or 60Hz input power.

The use of microwave frequency energy for the heating and cooking of foodstuffs is well known, and microwave ovens are in increasingly common use in many parts of the world. Unfortunately, the frequency and voltage of the electrical power supplied to buildings has not been standardized throughout the world with the result that electrical appliances manufactured in one country may no be operable in other countries because of differing electrical power supplied. In some countries, such as Japan, the frequency of electric power varies within the country, such power being supplied at a frequency of 50Hz in some areas and 60Hz in other areas.

While the use of differing power frequencies creates problems with many electrical appliances, the problem is particularly troublesome in microwave ovens. Most microwave ovens operate at a fixed power output from the microwave generating source, such as a magnetron. The heating or cooking of a variety of foods is accomplished by varying the length of time in which the food is exposed to microwave energy. Thus, virtually all microwave ovens are equipped with a timing device and the user is instructed to heat or cook a particular food for a prescribed period of time, which time is a function of the output power level of the magnetron. Thus, the amount of time required to cook a given portion of food to a desired degree will be longer at a microwave power level of 600 watts than at 1000 watts. It is therefore important that the power level not be affected by a change in electrical input power.

SUMMARY OF THE INVENTION

It is an object of the present invention to provide a microwave oven power supply which is readily adaptable to operation at more than one input power frequency while maintaining a constant microwave output power level. A further objective of the invention is to provide a microwave oven power supply wherein the oven can be converted from operation at a first input power frequency to operation at a second input power frequency by changing a single electrical connection in the oven power supply circuit without affecting the microwave power level of the oven.

The invention is directed to a power supply for a microwave oven which includes a microwave generator, such as a magnetron; a transformer; a current rectifier; and a capacitor having at least two selectable capacitive values wherein a first capacitive value can be selected for operation of the circuit at a first input frequency and a second capacitive value can be selected for operation of the circuit at a second frequency.

DESCRIPTION OF PREFERRED EMBODIMENTS

Certain preferred embodiments of the present invention will be described by reference to the accompanying drawing in which the FIGURE is an electrical line diagram illustrative of the power supply circuit.

Electrical lines L1 and L2 schematically represent the input source of electrical power to the circuit shown. In practice the application of power to lines L1 and L2 is accomplished by means of insertion of a plug into an available power receptacle in the customary fashion.

Due to the inherent characteristics of microwave energy, which is considered to be hazaradous to human health in the event of exposure to sufficiently high power levels, various switches are provided to insure proper and safe operation of the microwave oven, including limiting operation to a door-closed condition only. Accordingly, in addition to on-off switch 10, the circuit includes chassis interlock switches 11a and 11b, and door interlock switches 12 and 13. These switches are customarily snap-action switches which must be closed before the circuit can function. Switches 11a and 11b insure that the cabinet wrap is securely fastened to the chassis, and switches 12 and 13 insure that the oven door is closed before the power circuit will operate.

Other safety devices include interlock monitor switch 14 which is configured to close whenever the oven door is open. Should current flow in the circuit with the door open, fuse 19 will blow very quickly to interrupt the circuit. Circuit breaker 23, which may be a bimetal strip, is positioned to measure the temperature of magnetron 29 and interrupt the power in the event of overheating.

The circuit includes a first autotransformer having a primary winding 20a and a secondary winding 20b, and a second transformer 28. Autotransformer primary 20a serves to provide normal 120v operating voltage to the various motors and lamps while making the necessary adjustments for variation in input voltage, such as 100 volts found in some countries, rather than a normal 115-120v found in the United States. Autotransformer secondary 20b provides the stepped-down voltage used to pre-heat the filament of the gaseous dicharge device, namely magnetron 29. Transformer 28 serves to step-up the line voltage to the high voltage required for the operation of magnetron 29.

Magnetron 29 and capacitor 30 are connected in series with the secondary of transformer 28. A current rectifier, shown schematically as diode 31 is connected in series with the secondary of transformer 28 and capacitor 30, and in parallel with magnetron 29. As illustrated in the drawing, capacitor 30 is of the type having dual capacitance, either of which capacitance may be selected by selectively connecting either pin connector 30a or pin connector 30b.

The schematic shown in the drawing makes provision for various other electrically powered functions desirble in microwave ovens. Thus, motor 21 is provided to provide driving power to a blower or fan which may be used to cool various electrical components such as the magnetron and transformers, and to provide a flow of air through the oven cavity to remove condensation. Motor 27 provides operating power to a stirring device located in the waveguide or oven cavity to provide better dispersion patterns for the microwave energy within the oven cavity.

Lamps 22, 25 and 26 can be utilized to signal a variety of conditions for the user of the oven, and the use and function of such lamps can be varied by those skilled in the art. As shown, lamp 22 provides interior lighting for the oven cavity. Lamp 25 is an indicator that the circuit has been energized and the oven is ready to operate, and also signals the completion of the heating cycle, indicating that the food is "ready." Lamp 26 indicates that the oven is in operation during the cooking or heating period.

Microwave ovens are conventionally equipped with a timing device which may be of various types, the function of the device being to allow the operator to preselect a given cooking time. One such type of timer provides a plurality of push buttons, each button corresponding to a different preselected time. In the drawing, the timing function is illustrated by push button switch 24, and it will be understood that a plurality of push buttons could be provided in the circuit at that point. The closure of door interlock switch 13 energizes time delay relays 15 and 16 to begin a period of warm-up time, typically 10 seconds. Transfer of push button 24 allows energization of relay 17 to close contacts 17a and 17b to provide power to the primary winding of transformer 28.

Upon completion of the heating cycle, solenoid 18 is energized to release push button switch 24. Time delay relay 15 is provided to maintain the warm-up circuit in operating for a period of time following the heating cycle to keep the magnetron ready for re-energization.

OPERATION

It will be understood by those skilled in the art that the precise electrical values of the components shown in the drawing will be selected to provide the necessary functional matching between components, and to provide a circuit adaptable to the electrical power available. The power supply circuit of the present invention is designed to be adapted to various input power characteristics as might prevail in various areas of the world. Thus, in the United States, microwave oven operating circuits are commonly designed to operate on 115v – 120v, 60Hz power. In other areas of the world, for example portions of Japan, the common power supply is 100v, 50Hz. The power supply circuit of the present invention is readily adaptable to either of these two power conditions.

With the oven connected to a source of electrical power, lines L1 and L2 are potentially energized. Chassis interlock switches 11a and 11b are closed when the outer oven cabinet and the chassis are properly connected. With on-off switch 10 closed, the opening of the door begins the 10 second warm-up cycle. Upon closing the oven door, interlock switches 12 and 13 are closed. The operator selects an appropriate heating or cooking time after placing an article of food in the oven, the time selection being made by depressing and closing push button switch 24.

Power is not supplied to solenoid 17 until the lapse of a preselected time measured by time delay relay 16. This time delay allows a period of time wherein the secondary of transformer 20b is energized to warm-up the filament portion 29a prior to te application of full power to magnetron 29. Upon closure of contacts 17a and 17b of solenoid 17, power is applied to the primary of transformer 28.

The stepped-up output of the secondary of transformer 28 is applied to magnetron 29 through capacitor 30. Current rectifying is an operating characteristic of a magnetron in that it conducts in one direction only, e.g., during half of an alternating current cycle. In the circuit shown, current is conducted through diode 31 during the alternate half-cycles when magnetron 29 is not conducting, allowing capacitor 30 to be charged during alternate half cycles. In this manner, the power supplied to the magnetron 29 during each half cycle that it conducts if effectively doubled.

In the circuit of the present invention, capacitor 30 may be connected into the circuit by either pin connector 30a or 30b, depending upon the input power characteristics. Thus at 60Hz power input, the output of the secondary of transformer 28 will be greater than at 50Hz. Accordingly, the capacitive value of capactor 30 should be relatively lower at 60Hz than at 50Hz so that capacitor 30 stores less energy at 60Hz than at 50Hz to compensate for the increased output power of transformer 28. In this manner the power supplied to magnetron 29 may be kept constant at either 60Hz or 50Hz, hence constant power output from magnetron 29. Thus pin connector 30a is provided for 60Hz operation providing a capacitive value at a first level. For 50Hz operation, pin connector 30b connected to provide a capacitive value at a second, and in this case higher level.

The remaining circuit components that are frequency sensitive can also be accomodated to 50/60Hz operation through component selection. Thus motors 21 and 27 are preferably selected as nominally 50Hz components. At 60Hz the motors will operate somewhat faster, but this deviation does not have a negative performance result.

Upon completion of the preselected cooking or heating time designated by push button switch 24, solenoid 18 is activated to release switch 24, de-energizing relay 17 and opening contacts 17a and 17b to terminate the heating cycle. Time delay relay 15 remains energized for a selected period of time, typically 60 seconds, to maintain power to autotransformer primary 20a and secondary 20b. In this manner, the filament 29a of magnetron 29 is maintained in a heated condition so that the oven can be re-used during the 60 second period without waiting for an additional warm-up period. Upon expiration of the time period, time delay relay 15 is de-energized, opening contacts 15a, terminating power to the circuit.

The present invention provides a relatively simple, economical solution to the problem of adapting a microwave oven to operation at either 50Hz or 60Hz without changing the performance characteristics of the oven. In the past, the problem has been solved by actually manufacturing two different ovens, one specifically designed for 50Hz operating and a second designed for 60Hz operation. This approach of course leads to unnecessarily high inventory for the manufacturer and seller, and unnecessary risk for the consumer. In the past, the microwave oven owner who relocated from a geographic area having 60Hz power to one having 50Hz power would have to replace the entire appliance. With the circuit of the present invention, a single oven can be readily modified to meet either power condition through a change in connection of capacitor 30.

While in the foregoing specification the invention has been described in considerable detail, it will be understood that such detail is intended to fully illustrate the invention rather than to limit it; and that the scope of the invention is to be limited only by the appended claims.

I claim:

1. A power supply circuit for a microwave oven adapted to provide constant magnetron output power at either 50Hz or 60Hz input power frequency, said circuit including a magnetron for generating microwave frequency energy; a transformer having a primary winding connected to a source of alternating current electrical power and a secondary winding serially connected to said magnetron; a capacitor serially connected between said transformer secondary winding and said magnetron, said capacitor having first and second selectable capacitive values, said first capacitive value adapted to provide a predetermined energy level to said magnetron during 50Hz operation of said circuit, said second capacitive value adapted to provide said predetermined energy level to said magnetron during 60Hz operation of said circuit; means for selecting either of said first or second capacitive values; and current rectifying means electrically connected in series with said capacitor and in parallel with said mangetron to provide a current path during alternate half-cycles of said alternating current.

2. The circuit of claim 1 wherein said selecting means comprises first and second pin connectors.

3. The circuit of claim 1 wherein said current rectifying means comprises a diode.

* * * * *